(12) United States Patent
Mitsugi et al.

(10) Patent No.: US 7,358,483 B2
(45) Date of Patent: Apr. 15, 2008

(54) METHOD OF FIXING AN OPTICAL ELEMENT AND METHOD OF MANUFACTURING OPTICAL MODULE INCLUDING THE USE OF A LIGHT TRANSMISSIVE LOADING JIG

(75) Inventors: Naoki Mitsugi, Hino (JP); Hiroshi Miyakoshi, Hino (JP); Yoshiki Shibuya, Hachioji (JP)

(73) Assignee: Konica Minolta Holdings, Inc., Tokyo (JP)

(*) Notice: Subject to any disclaimer, the term of this patent is extended or adjusted under 35 U.S.C. 154(b) by 104 days.

(21) Appl. No.: 11/472,700

(22) Filed: Jun. 22, 2006

(65) Prior Publication Data
US 2007/0096020 A1    May 3, 2007

(30) Foreign Application Priority Data
Jun. 30, 2005    (JP)    ............... 2005-191609

(51) Int. Cl.
*H01J 5/02*    (2006.01)

(52) U.S. Cl. ...................... 250/239; 250/216

(58) Field of Classification Search ............... 250/239, 250/216, 208.1, 548; 359/820, 819, 487, 359/643
See application file for complete search history.

(56) References Cited

U.S. PATENT DOCUMENTS
5,851,328 A * 12/1998 Kohan ................. 156/102

FOREIGN PATENT DOCUMENTS
JP        03-198235 A    8/1991

* cited by examiner

*Primary Examiner*—Que T Le
(74) *Attorney, Agent, or Firm*—Frishauf, Holtz, Goodman & Chick, P.C.

(57) ABSTRACT

In the optical element fixing method, when optical element 10 is adhesively fixing member 20 by using the optical-curing adhesive, the optical-curing adhesive is applied on at least one of the adhesion sections of the optical element and the adhesive section of the fixing member, and the optical-curing adhesive is irradiated with the light from the light source through the loading jig while the load is being applied to the adhesion fixing section through loading jig 31 made of light-transmissive material.

10 Claims, 10 Drawing Sheets

METHOD OF FIXING AN OPTICAL ELEMENT AND METHOD OF MANUFACTURING OPTICAL MODULE INCLUDING THE USE OF A LIGHT TRANSMISSIVE LOADING JIG

This application is based on Japanese Patent Application No. 2005-191609 filed on Jun. 30, 2005, in Japanese Patent Office, the entire content of which is hereby incorporated by reference.

BACKGROUND OF THE INVENTION

The present invention relates to a method of fixing an optical element wherein the optical element is bonded and fixed on a fixing member by optical-curing adhesive, and to a method to manufacture an optical module.

In the past, to bond and fix an optical element such as a pick up lens and a micro lens used for an optical communication module on a fixing member such as a lens barrel, after applying UV curing adhesive, UV was radiated from a light source to the UV curing adhesive (hereinafter called UVA) so as to fix the optical element on the fixing member. For example, as shown in FIG. 14, to fix lens 100 on lens barrel 200, UVA was applied on collar-shaped retaining surface 220 in metal lens barrel 200 and adhesive layer 290 is formed by radiating UV from nozzle 30a of UV light source 30 to lens 100 in the status wherein lens 100 is positioned so that its surface 150 faces retaining surface 220. Meanwhile, it is a merit in terms of cost and lightweight that the optical element such as lens 100 is made of resin material.

Also, the Patent Document 1 below discloses an optical disc member adhering method in which UV is radiated through a filter that intercepts UV having a wavelength of not more than 290 nm so that the durability of adhering force is improved without deteriorating each member of the optical disk by UV when bonding the optical dick members by using UVA.

In the Patent Document 1, as shown in FIG. 4 and FIG. 7 of the document, a glass plate to intercept the light having wavelength of not more than 290 nm is placed on a disk substrate where adhesive is applied in between, and in a status wherein a hollow cylindrical weight made of stainless steel is placed on the glass plate, a plurality of optical fibers are arranged on the outer circumference of the stuck and at the center hole so as to radiate UV from an UV radiation device to the glass plate through each optical fiber.

(Patent Document 1) Unexamined Japanese Patent Application Publication No. Tokkaihei 03-198235

An experimental test performed by inventors of the present invention clarified that it is necessary to radiate UV for a certain period of time to harden UVA, however on the other hand, if UV light is irradiated to the optical element for more than 10 sec, a temperature of the optical element will increase considerably and there is caused a bad effect such as deformation of the lens surface of the optical element, in case an optical element such as a lens is made of resin material. Also it was found that a thickness of adhesive layer will be even, by applying pressure to an adhesion surface where the UVA is applied while the adhesive is hardened by radiating UV.

However, in case, a micro lens having an outer diameter of 4 to 5 mm is fixed by an adhesive on such a lens barrel as shown in FIG. 14, the only way of radiate UV on the adhesive is to radiate UV through the lens because the metal lens barrel is not light-transmissive. It is considerably difficult to arrange a weight in the lens barrel and to radiate UV through the optical fibers arranged in the center hole and on the circumference of the weight as shown in FIG. 4 and FIG. 7 in the Patent Document 1. Also the structure to arrange the weight and the optical fibers is complicated, thus, the process of hardening adhesive is time-consuming, which lowers productivity.

SUMMARY OF THE INVENTION

In view of the above problems of the aforesaid conventional art, an object of the present invention is to provide a method of fixing an optical element and a method of manufacturing an optical module, wherein a thickness of the hardened optical-curing adhesive can be made even with a simple configuration and an adverse effect such as a temperature rise in the optical element can be suppressed even if UV is radiated to the optical element for adhesion fixing by the optical-curing adhesive.

To attain the aforesaid object, a method of fixing an optical element in the invention is a method of fixing an optical element to bond and fix the optical element on a fixing member with optical-curing adhesive, wherein the aforesaid optical-curing adhesive is applied on at least one of the adhesion section of the optical element and the adhesion section of the fixing member and then, a light source radiates light through a loading jig to irradiate the aforesaid optical-curing adhesive while applying a load on the aforesaid adhesion section though the loading jig made of a light-transmissive material.

In the method of fixing optical element, the thickness after curing of the adhesive can be made even, because a load is applied to the adhesion fixing section through the loading jig while light is being radiated from the light source through the loading jig made of the light-transmissive material such as glass when the light is radiated from the light source to the optical-curing adhesive applied to the adhesion fixing section so as to harden the adhesive. Also there is no need to provide the specific optical fibers to radiate the light from the light source as radiation can be done through the loading jig. Thus the thickness of the adhesive can be made even with a simple structure.

In this case, the light-transmissive material has a characteristics to absorb the light having a wavelength which does not contribute to hardening of the optical-curing adhesive applied on the adhesion fixing section. Therefore, the light having a wavelength which does not contribute to hardening of the optical-curing adhesive is absorbed when the light is radiated through the loading jig, thus the adverse effect such as a temperature rise the optical element can be suppressed effectively.

Also, efficiency of curing of the adhesive is improved and light radiation time is shortened by a characteristic of transmitting the light having a wavelength which contributes to curing of the optical-curing adhesive. Therefore, the loading jig is composed of a material having filtering function which allows passing of necessary light (for example, a wavelength of 300 to 450 nm) to cure the optical-curing adhesive. Also, for example, if the light source itself cuts off the wavelength of over 450 nm, the filter has only to be the one that transmits 300 nm or more, without being the one that transmits 300 to 450 nm, as a filter function.

Specifically, in case the optical-curing adhesive is UVA, it is preferred that the light-transmissive material has a characteristic to absorb the light having a wavelength of not more than 300 nm and to transmit the light having a wavelength of 300 to 450 nm.

By absorbing light having a wavelength of not more than 300 nm, adverse effect such as the temperature rise can be suppressed effectively, and curing of the adhesive in short time becomes possible compared to radiation not through the loading jig at the temperature lower than the temperature at which the optical element is affected when transmitting the light having a wavelength in a range of 300 to 450 nm.

Also, the loading jig has a light restriction section to restrict the light so that the light is not radiated to the optical functional section of the optical element when the light is radiated. Whereby, it prevents deterioration of an optical functional section such as lens function caused by light radiation.

Also, the loading jig has an optical waveguide section to guide the light to the adhesion fixing section when the light is radiated, which makes effective light radiation possible and enhances curing of the adhesive.

Also, by conducting light radiation after positioning the fixing member, the optical element, the loading jig and the light source with the positioning member, position of the light source becomes stable so that light radiation with good reproducibility is realized, and thereby the optical element and fixing member can be bonded and fixed in the same high quality.

Meanwhile, by roughening at least one of the surfaces of the adhesion fixing section of the optical element and the adhesion fixing section of the fixing member with surface roughening process methods such as blasting, machining, laser beam irradiation, plasma processing or chemical treatment, the adhesive can be applied evenly to make the thickness of the adhesive uniform and a shearing strength of the adhesion can be increased.

Also, the pressure against the adhesion fixing section through the loading jig is preferred to be between 0.5 to 2 kgf/cm$^2$ and if the pressure is not less than 0.5 kgf/cm$^2$, the thickness of the adhesive can be made even practically sufficient, and if it is not more than 2 kgf/cm$^2$, the thickness of the adhesive does not become too thin and distortion or deformation of the optical element can not occur. When the pressure by the loading jig is represented by its own weight, appropriate pressure can be obtained by adjusting the size (dimension) of the loading jig.

In the manufacturing method of the optical module of the present invention, the optical module where the optical element is bonded and fixed on the adhesion fixing section of the fixing member at the adhesion fixing section, is manufactured by fixing the optical element on the fixing member through the aforesaid optical element fixing method.

In the manufacturing method of the optical module, the thickness of the adhesive can be made uniform with a simple structure by applying a load on the adhesion fixing section through a loading jig while light is irradiated through the loading jig which is made of a light-transmissive material and also the light-transmissive material absorbs the light having a specific range of wavelength which does not contribute to harden the optical-curing adhesive so that the obverse effect such as the temperature rise of the optical element is suppressed. Therefore, the optical element can adhere to fixing member consistently and firmly, and a high quality optical module can be obtained.

The aforesaid manufacturing method of the optical module is preferable when it is applied to the occasion where the optical module is of the structure where light is radiated to the adhesion fixing section through the optical element. For example, it is preferable to be applied to the occasion of an optical module where the optical element is fixed inside the fixing member such as non-transmissive lens barrel, and light cannot be radiated to the adhesion fixing section through the optical element.

In the fixing method of the optical element and the manufacturing method of the optical module of the present invention, the thickness of the optical-curing adhesive after cured can be made uniform with the simple structure so that the adhesion strength and the characteristics of adhesion can be stabilized. Also, adverse effect such as the temperature rise of the optical element can be suppressed even when light such as UV is radiated to the optical element for adhesion fixing by optical-curing adhesive.

BRIEF DESCRIPTION OF THE DRAWINGS

FIG. 13(b) is a diagram showing a measurement of the thickness of the adhesive after curing.

DESCRIPTION OF THE PREFERRED EMBODIMENT

The following is a description of the preferred embodiments of this invention using the drawings.

The First Embodiment

Figure 1:
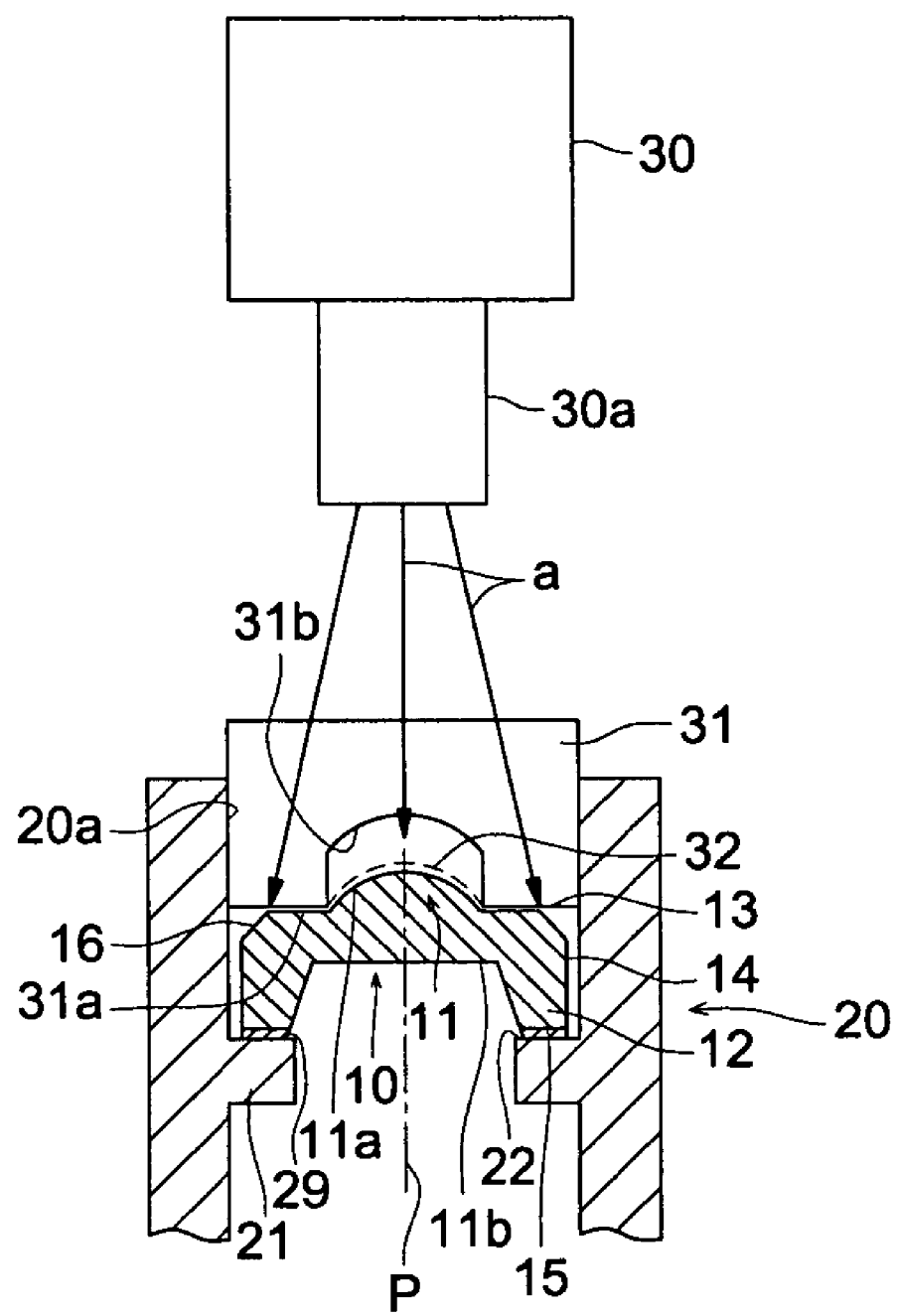
FIG. 1 is a vertical cross-sectional view of essential portion showing a lens fixing structure, an UV source, and a loading jig to explain an optical element fixing method of the first embodiment.

FIG. 1 is a vertical cross sectional view of essential portion showing a lens fixing structure, an UV light source, and a loading jig to explain an optical element fixing method of the first embodiment.

In the lens fixing structure in FIG. 1, lens 10 is bonded and fixed on inner surface 20a of cylindrical lens barrel 20.

Lens 10 is a plastic lens made of a resin for a optical element having lens section 11 provided with lens function, peripheral section 13 which is located at an outer circumference of lens section 11 and extended to outermost circumference 14 of lens 10 and mounting section 12 projecting from peripheral section 13 in a direction almost parallel to the optical axis p. Lens 11 has a convex section 11a with light axis p as a center and flat surface 11b on the reverse side of convex section 11a is extended from lens section 11 to a part of peripheral section 13. Peripheral section 13 and mounting section 12 can configure stress relief section.

Mounting section 12 is extended from peripheral section 13 toward the opposite side of convex section 11a to form a leg section in substantially short columnar shape and a peripheral facing to inner surface 20a of lens barrel 20 forms outermost circumference 14 of lens 10. An end section of mounting section 12 is formed on retaining surface 15 in a direction perpendicular to optical axis p. Also, an upper part of the figure of outermost circumference 14 is chamfered at an edge to form chamfer section 16.

Lens barrel 20 has retaining section 21 which is formed in a collar-shaped projecting from inner surface 20a of lens barrel 20 in a direction perpendicular to optical axis p (inward radial direction of lens barrel 20) and mounting surface 15 of mounting section 12 of lens 10 faces collar shape retaining surface 22 of retaining section 21.

Lens barrel 20 is made of iron-nickel-cobalt alloy (for example, trade name "Kovar") and is plated with Ni or Cr. Lens barrel 20 may also be made of other metal such as steel, stainless steel, aluminum or aluminum alloy. Whole surface of plated collar shape retaining surface 22 of retaining section 21 of lens barrel 20 in FIG. 1 is roughened by sand blast treatment.

A process to adhesively fix the aforesaid lens 10 on lens barrel 20 is explained as follows: Firstly, liquid type UVA is applied on retaining surface 22 of lens barrel 20. Epoxy or acrylic base are preferred for UVA.

Next, lens 10 is inserted from upper side of FIG. 1 into lens barrel 20 with mounting section 12 facing downward and placed on retaining surface 22, and thereby adhesive layer 29 is formed between mounting surface 15 and retaining surface 22. Meanwhile, the liquid adhesive can also be applied on mounting section 12 of lens 10 beforehand.

Next, as shown in FIG. 1, by inserting cylinder-shaped loading jig 31 made of a light-transmissive material from the end of lens barrel 20 into inner surface 20a toward upper part of lens 10 so as to bring end surface 31a of loading jig 31 into contact with peripheral section 13 of lens 10, UV a is radiated from nozzle 30a of UV light source 30 to lens 10 through loading jig 31 while load is being applied on adhesion layer 29 with loading jig's own weight.

The aforesaid loading jig 31 made of a glass material (BK7) with thickness (height) of 2.6 mm for example, can absorb and cut off 98% or more of the light having unnecessary wavelength (approx. 250 nm) for UV hardening of adhesive layer 29, and can transmit 70 to 80% of the light having necessary wavelength from 350 to 450 nm for UV curing of adhesive layer 29.

Also, it is preferred that the size (in particular height dimension) of loading jig 31 is adjusted so that the pressure due to own weight of loading jig 31 against mounting surface 15 of lens 10 may be in a range of 0.5 to 2 kgf/cm$^2$.

By radiation of UV a to lens 10, UV a is radiated to adhesive layer 29 lying between mounting surface 15 and retaining surface 22, through loading jig 31 and mainly through peripheral section 13 and mounting section 12 of lens 10, whereby adhesive layer 29 is cured. Meanwhile, the thickness of adhesive layer is preferred to be 5 to 10 μm.

In the aforesaid manner, lens 10 can be adhesively fixed on lens barrel 20. When UV is radiated from UV light source 30, loading jig 31 made of such glass material as above is placed before lens 10 which is an irradiated body so that not less than 98% of light having unnecessary wavelength for UV curing of adhesive layer 29 can be cut off. Therefore, a temperature rise in lens 10 due to UV radiation can be suppressed, 70 to 80% of light having wavelength of 350 to 450 nm necessary for UV curing of adhesive layer 29 can be transmitted and curing of adhesive can be carried out in a short time compared with a case without loading jig 31, at a temperature (for example, 70° C.) below the temperature where lens 10 is adversely affected.

Also, a lens fixing structure shown in FIG. 1, is a structure where lens barrel 20 representing a fixing member is made of a metal material and is not light-transmissive, lens 10 is fixed on an inner surface of lens barrel 20, UV cannot be radiated neither through the side surface of outermost circumference 14 of lens 10 nor retaining section 21 of lens barrel 20, and UV cannot be radiated to mounting surface 15 representing adhesion fixing section and retaining surface 22 except through lens 10. However, the optical element fixing method of the present embodiment can preferably be applied to the aforesaid lens fixing structure thereof.

As mentioned above, in the optical element fixing method of the embodiment, specific arrangement of the optical fibers is not required to radiate a light from a light source, the thickness of adhesive layer 29 after curing can be made uniform with a simple structure, the adhesion strength and the adhesion characteristic can be stabilized, an adverse effect due to the temperature rise caused by irradiating UV to lens 10 can be suppressed, and deformation of lens 10 which is made of a resin for optical element caused by heat can be prevented.

Also, when the aforesaid UV irradiation is carried out, an adverse effect such as deterioration of the portion other than mounting surface 15, in particular, lens section 11 caused by light radiation can be prevented, by arranging sheet form light shielding member 32 to cover convex section 11a of lens section 11 of lens 10 as indicated by broken lines in FIG. 1.

Meanwhile, since the retaining surface 22 representing the adhesion surface is roughened, as mentioned above, when the adhesive is applied on retaining surface 22 of lens barrel 20, the adhesive can spread more easily on the roughened surface than on the plated surface before roughening, and the thickness of adhesive layer 29 can be controlled more easily to be made even. Also it is preferred that UV is radiated while applying a load on lens 10 in a direction of a thickness of the adhesive layer 29, and thereby, the thickness of adhesive layer 29 can be made even and the adhesion strength and adhesion characteristic are stabilized.

Second Embodiment

FIG. 2 to FIG. 5 are vertical cross-sectional views of essential portions showing schematically the lens fixing structures and the loading jigs for explaining fixing methods of each optical element of the second embodiment.

Figure 3:
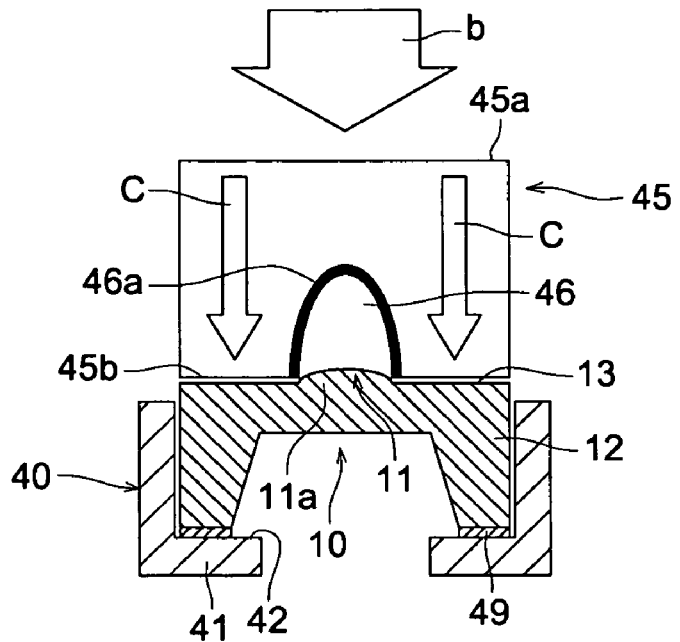
FIG. 3 is a vertical cross-sectional view of essential portion showing an outline of a lens fixing structure and a loading jig to explain another optical element fixing method of the second embodiment.
Figure 4:
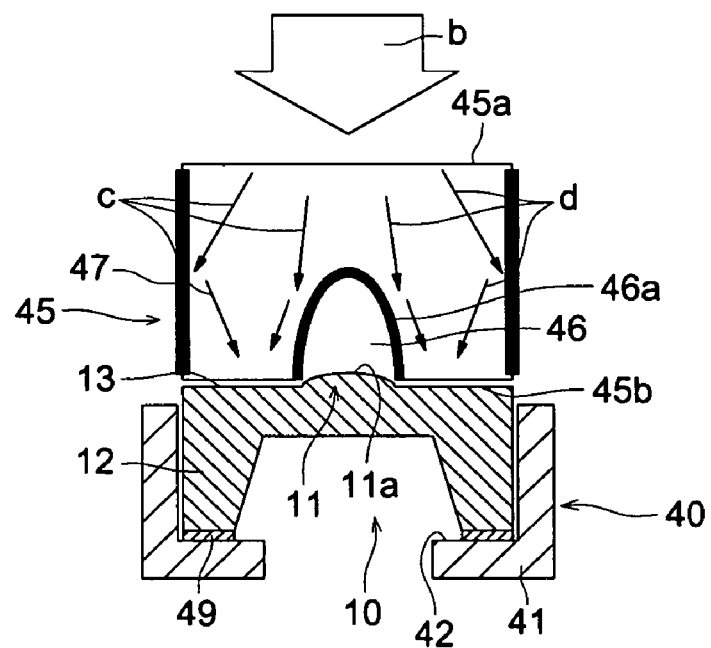
FIG. 4 is a vertical cross-sectional view of essential portion showing an outline of a lens fixing structure and a loading jig to explain still another optical element fixing method of the second embodiment.

In the optical element fixing method of the second embodiment, the loading jig is made of a light-transmissive material, and UV is radiated while applying a load in a direction of thickness of adhesive through the lens by the loading jig. Meanwhile, the lenses to be adhesively fixed in FIG. 2 to FIG. 4 are almost the same as lens 10 in FIG. 1, so that the same portions are given the same symbols and descriptions of them are omitted.

Figure 2:
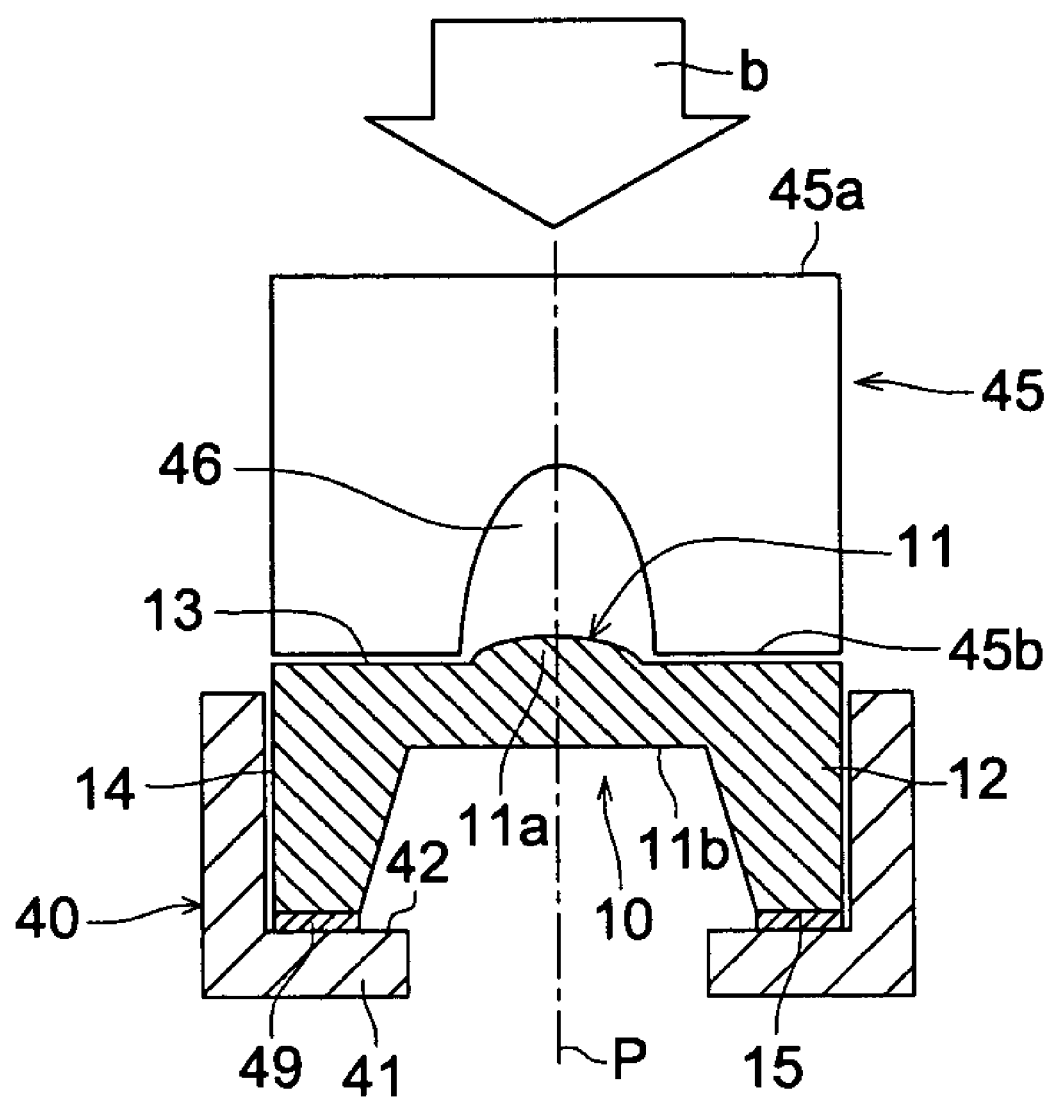
FIG. 2 is a vertical cross-sectional view of essential portion showing an outline of a lens fixing structure and a loading jig to explain an optical element fixing method of the second embodiment.

An example shown in FIG. 2 is a lens fixing structure in which cylindrical lens barrel 40 has retaining section 41 which is protruded to be in a collar shape in a direction perpendicular to optical axis p at lower part, and mounting surface 15 of mounting section 12 of lens 10 adhesively fixed to collar-shaped retaining surface 42 of retaining section 41 to face it. Meanwhile, lens barrel 40 is made of the same metal material as in lens barrel 20 in FIG. 1.

In FIG. 2, a load is applied in a direction of a thickness of adhesive layer 49 located between mounting surface 15 of lens 10 and retaining surface 42 of lens barrel 40 through loading jig 45. Loading jig 45 is made of glass material (BK7) as in the loading jig in FIG. 1 to be formed in a shape of cylindrical column, and is placed on outer circumference section 13 so that a load may be applied thereon from the upper surface 45*a* side.

The process to adhesively fix the aforesaid lens 10 on lens barrel 40 by using the loading jig 45 is explained as follows: firstly, liquid type epoxy or acrylic based UVA is applied on retaining surface 42 of lens barrel 40.

Next, lens 10 is inserted into lens barrel 40 with mounting section 12 facing downward from upper part of FIG. 2 to be placed on retaining surface 42, and thereby, adhesive layer 49 is formed between mounting surface 15 and retaining surface 42. Meanwhile, the liquid adhesive can also be applied on mounting section 12 of lens 10 beforehand.

Next, as in FIG. 2, loading jig 45 is placed on outer circumference section 13 of lens 10, then, UV is radiated from a UV light source (unillustrated) in UV radiation direction b to let UV enter from upper surface 45*a* of loading jig 45, and lens 10 is pressed against retaining surface 42 of lens barrel 40 by applying a load onto loading jig 45 to apply the load to adhesive layer 49 in its thickness direction.

The aforesaid loading jig 45 made of a glass material with thickness of 2.6 mm for example, can absorb and cut off 98% or more of the light having unnecessary wavelength (approx. 250 nm) for UV curing of adhesive layer 49, and can transmit 70 to 80% of the light having necessary wavelength from 350 to 450 nm for UV curing of adhesive layer 49.

By the aforesaid UV radiation to loading jig 45, the incident UV from upper surface 45*a* of loading jig 45 is radiated from lower surface 45*b* to adhesive layer 49 between mounting surface 15 and retaining surface 42 through outer circumference section 13 of lens 10 and mounting section 12, thus, adhesive layer 49 is hardened.

In the aforesaid manner, lens 10 can be adhesively fixed on lens barrel 40 by radiating UV from the UV light source to adhesive layer 49 through loading jig 45. In this process, in loading jig 45, by cutting off 98% or more of light having unnecessary wavelength for UV curing of adhesive layer 49, a temperature rise caused by UV radiation in lens 10 can be suppressed, and by transmitting 70 to 80% of light having wavelength of 350 to 450 nm necessary for UV curing of adhesive layer 49, curing of the adhesive can be carried out in a short time compared with a case where UV is radiated without passing through loading jig 45 at a temperature (for example, 70° C.) below the temperature that adversely affects lens 10.

Also the adhesive layer 49 can be made even in terms of thickness by applying the load to adhesive layer 49 in a thickness direction of the adhesive layer 49 through the loading jig 45 and lens 10 during irradiation, and the adhesion strength and the characteristics of adhesion can be stabilized.

Also, a lens fixing structure shown in FIG. 2, is a structure where lens barrel 40 i.e. a fixing member is made of a metal material is not light-transmissive, lens 10 is fixed to the inner surface of lens barrel 40, UV can be radiated neither from the side surface of outermost circumference 14 nor retaining section 41 of lens barrel 20, thus, UV can be radiated to mounting surface 15 representing the adhesion fixing section and to retaining surface 42 only through lens 10. The optical element fixing method of the present embodiment can be applied preferably to the aforesaid lens fixing structure and the thickness of adhesive layer 49 can be made even and the adverse effect such as the temperature rise can be suppressed even if the UV is radiated to lens 10.

Meanwhile, similarly to the embodiment in FIG. 1, roughening of retaining surface 42 of lens barrel 40 is preferred, whereby the adhesive can be spread easily and the thickness of adhesive layer 29 can easily be controlled to be even.

Next, an example in FIG. 3 is explained. FIG. 3 is the same as FIG. 2 except that the embodiment in FIG. 3 differs from that in FIG. 2, on the point that reflection surface 46*a* is formed on the concave surface of concave section 46 of loading jig 45 of FIG. 2. Reflection surface 46*a* can be formed by nickel, aluminum or chrome metalizing.

In the same manner as in FIG. 2, when adhesive layer 49 is irradiated with UV from the UV light source in a direction of UV radiation b through loading jig 45, incident UV in loading jig 45 is reflected by reflection surface 46*a* of concave section 46 of loading jig 45 in FIG. 2, and is restricted to go toward lens section 11 of lens 10 from concave section 46 then goes toward lower surface 45*b* in an arrow direction c of FIG. 3 to enter lens 10. Therefore, as lens section 11 is not irradiated with UV, the deterioration of lens section 11 is prevented, UV increases by an amount of reflection by reflection surface 46*a*, and adhesive layer 49 is irradiated effectively, hardening of the adhesive is enhanced and light irradiation time can be shortened.

Next, an example in FIG. 4 is explained. FIG. 4 differs from FIG. 3 at an aspect where reflection surface 47 is formed at an outer circumference of loading jig 45 in addition to the reflection surface 46*a* of loading jig 45 in FIG. 3, except that, it is the same as FIG. 4. Reflection surface 47 can be formed by nickel, aluminum or chrome metalizing.

In the same manner as in FIG. 2, when adhesive layer 49 is irradiated with UV from the UV light source in a direction of UV radiation b through loading jig 45, an incident UV in loading jig 45 is reflected by reflection surface 46*a* of concave section 46 of loading jig 45 and reflected by reflection surface 47 of the outer circumference, then the UV is conducted in an arrow direction d in the drawing to lower surface 45*b* to enter lens 10. Therefore, as lens section 11 is not irradiated with the UV, the deterioration of lens section 11 is prevented, the UV increases by an amount of reflection by reflection surface 46a, and adhesive layer 49 is irradiated effectively, hardening of the adhesive is enhanced and light irradiation time can be shorten.

Figure 5:
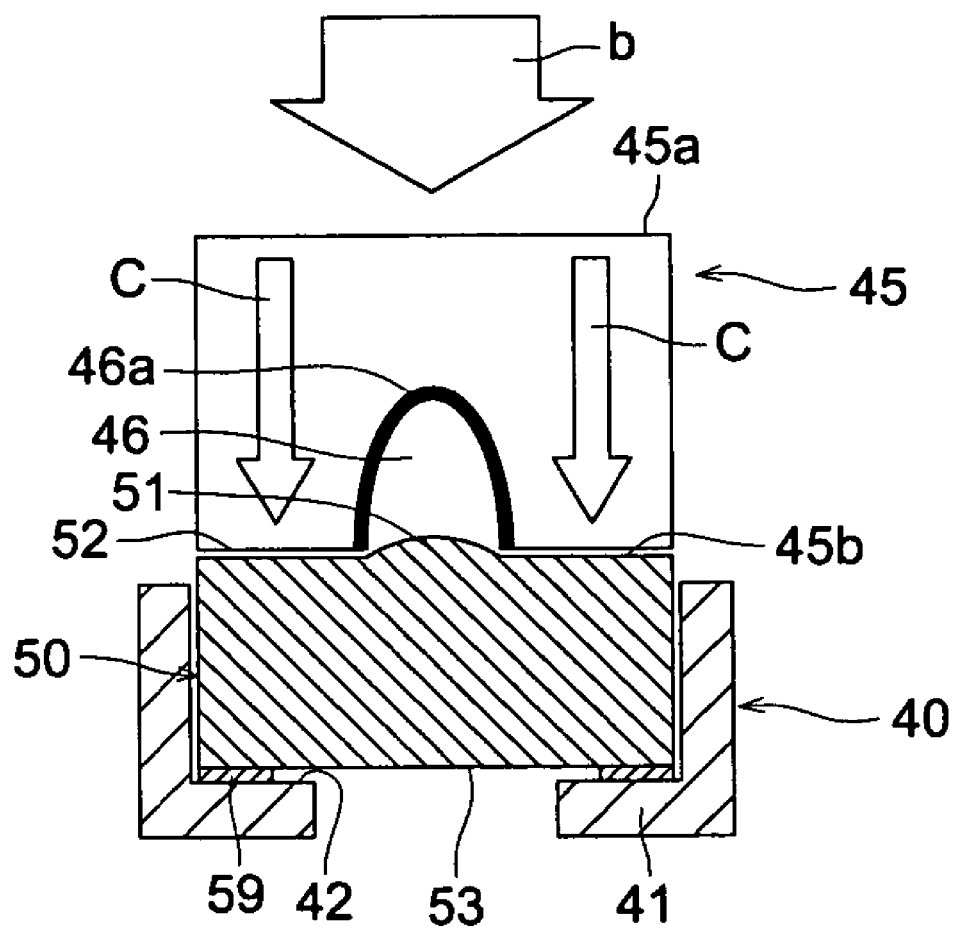
FIG. 5 is a vertical cross-sectional view of essential portion showing an outline of a lens fixing structure to explain yet another optical element fixing method of the second embodiment.

Next, an example in FIG. 5 is explained. FIG. 5 is the same as FIG. 3 except that lens 50 to be adhesively fixed, has an ordinary and substantially columnar shape, without being the same as the aforesaid lens 10 in which the mounting section 12 is extended to be in a form of legs. In lens 50, lens is formed by convex section 51 which is projecting from flat upper surface 52 and the outer circumference side of flat lower surface 53 faces retaining surface 42 of lens barrel 40 to form adhesive layer 59 between retaining surface 42 and the outer circumference of lower surface 53.

Loading Jig 45 has the same configuration as that of FIG. 3, and when adhesive layer 59 is irradiated with UV from UV light source in a direction of UV radiation b through loading jig 45, since the incident UV in loading jig 45 is reflected by reflection surface 46a of concave section 46, UV is restricted to go toward convex section 51 of lens 50 from concave section 46, then goes toward lower surface 45b in an arrow direction c of FIG. 5 to enter lens 50. Therefore, as convex section 51 is not irradiated with the UV, the deterioration of convex section 51 is prevented, the UV increases by an amount of reflection by reflection surface 46a, and adhesive layer 59 is irradiated effectively, hardening of the adhesive is enhanced and light irradiation time can be shortened.

As mentioned above, lens 50 having substantially columnar shape can be adhesively fixed to retaining surface 42 of lens barrel 40 by adhesive layer 59. However, in case of the structure in FIG. 5, the adhesion fixing of lower surface 53 and retaining surface 42 cannot be irradiated with UV except through lens 50. The optical element fixing method in FIG. 5 is preferred to apply to the lens fixing structure thereof, and an adverse effect such as a temperature rise can be suppressed, even if lens 50 is irradiated with UV.

The Third Embodiment

Figure 6:
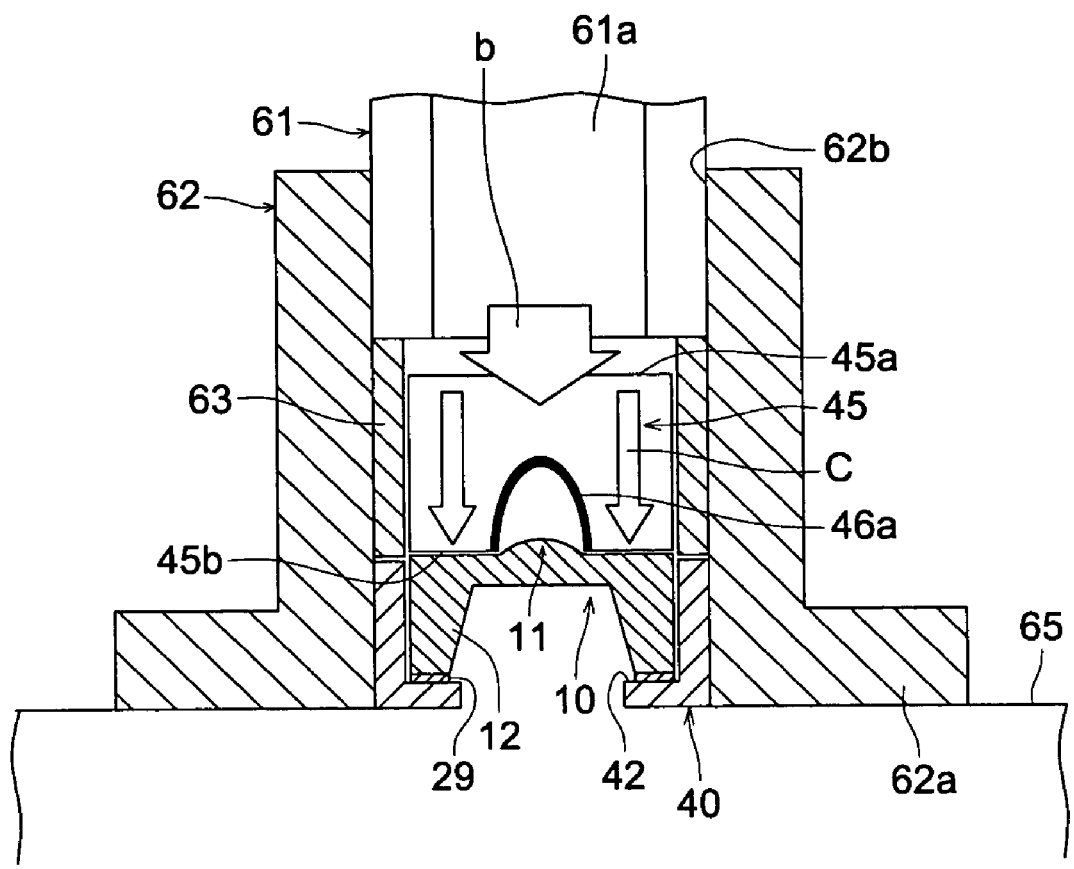
FIG. 6 is a vertical cross-sectional view of essential portion showing an outline of a lens fixing structure, a loading jig and an UV source nozzle and a positioning member to explain an optical element fixing method of the third embodiment.

FIG. 6 is a vertical cross-sectional view of essential portion schematically showing a lens fixing structure, a loading jig, a nozzle of UV light source and a positioning member to explain an optical element fixing method of the third embodiment.

An example of FIG. 6 is to align the nozzle 61 of the UV light source with lens barrel 40, lens 10 and loading jig 45 when the lens structure in FIG. 3 is realized by the loading jig.

As FIG. 6 shows, positioning member 62 is formed in a cylindrical shape and has collar-shaped placing section 62a which is projecting on the bottom. Also, the UV light source has nozzle 61 having inner hole 61a through which UV is radiated in UV radiation direction b, and the end nozzle 61 is inserted from upper side of the drawing into inner surface 62b of positioning member 62.

As FIG. 6 shows, while positioning member 62 is placed stably on workbench 65 by placing section 62a, lens barrel 40 is arranged in inner surface 62b, then, a liquid adhesive is applied on retaining surface 42 of lens barrel 40, and after that, lens 10 is placed and loading jig 45 is placed on lens 10. Then, UV light source nozzle 61 is inserted in inner circumference surface 62b of positioning member 62 after cylindrical supporting member 63 is arranged around loading jig 45 in inner circumferential surface 62b. Thereby, UV light source nozzle 61 is aligned with cylindrical support member 63 and lens barrel 40, consequently, it is aligned with loading jig 45 and lens 10.

By radiating UV from UV light source in a UV radiating direction b through inner hole 61a of nozzle 61 in such arrangement in FIG. 6, adhesive layer 29 is irradiated through loading jig 45 and lens 10 and adhesive layer 29 is hardened in the same manner as in FIG. 3.

In the optical element fixing method using positioning member 62 as shown in FIG. 6, positioning member 62 aligns and fixes UV light source nozzle 61, and also, lens barrel 40, lens 10 and loading jig 45 are aligned with nozzle 61 to be fixed solidly. Thus, the position of the UV light source is stabilized, and excellent reproducibility of UV radiation can be realized, and lens 10 can be adhesively fixed onto lens barrel 40 with adhesive layer 49 in the same high quality.

Figure 7:
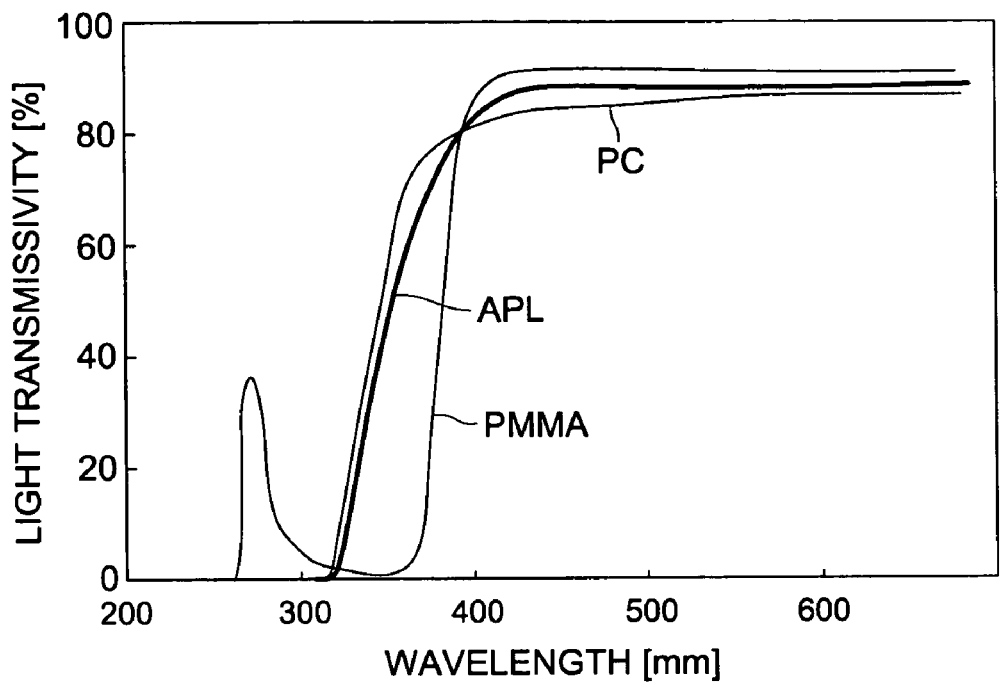
FIG. 7 is a graph of light-transmissive characteristic indicating a relation between a light transmission and wavelength of 3 kinds of resin materials (PC, APL and PMMA).

In the first embodiment to the third embodiment, lens 10 and lens 50 can be plastic lenses made of various kinds of resin materials. Light-transmissive rate of each resin material decreases in a wavelength not more than 300 nm and in particular, in case of PC and APL, it is clarified that the light-transmissive rate becomes almost zero as light-transmissive characteristics of three kinds of resin material (PC, APL and PMMA) are shown in FIG. 7. Almost zero in light-transmissive rate means that the most light within that wavelength is absorbed, and the resin material generates heat with the energy of the light absorbed. On the other hand, UV curing-adhesive is hardened by light having a wavelength in a rage of 300 to 450 nm. From the above, in the first embodiment to the third embodiment, during radiation of UV, heat generation of lenses 10 and 50 can be suppressed and adhesive layers 29, 49 and 59 can be hardened effectively by transmitting the light having the wave length in the range of 300 to 450 nm, and by absorbing the light having wave length not more than 300 nm by means of loading jigs 31 and 45 before the lens irradiation.

EXAMPLE OF EMBODIMENT

Next, the present invention is explained more specifically, referring to the examples.

Preliminary Experiment Example 1

As a preliminary experiment example 1, a surface temperature in the irradiation by the UV through a glass plate (BK7) was measured. Also, as a comparative experiment 1 UV, a surface temperature in the direct irradiation by the UV through no glass plate (BK7) was measured.

In the preliminary experiment example 1 and the comparative experiment example 1, Aicure SPOT TYPE ANUP5204 of Matsushita Electric Works, Ltd. was used as a UV radiation device (UV light source) and a surface temperature at a position which is 2.5 cm from a nozzle end to radiate the light was measured by a thermo couple. In the preliminary experiment example 1, a glass plate with thickness of 2.6 mm was placed at a position which is 10 mm from the surface. The results are shown in FIG. 8.

Figure 8:
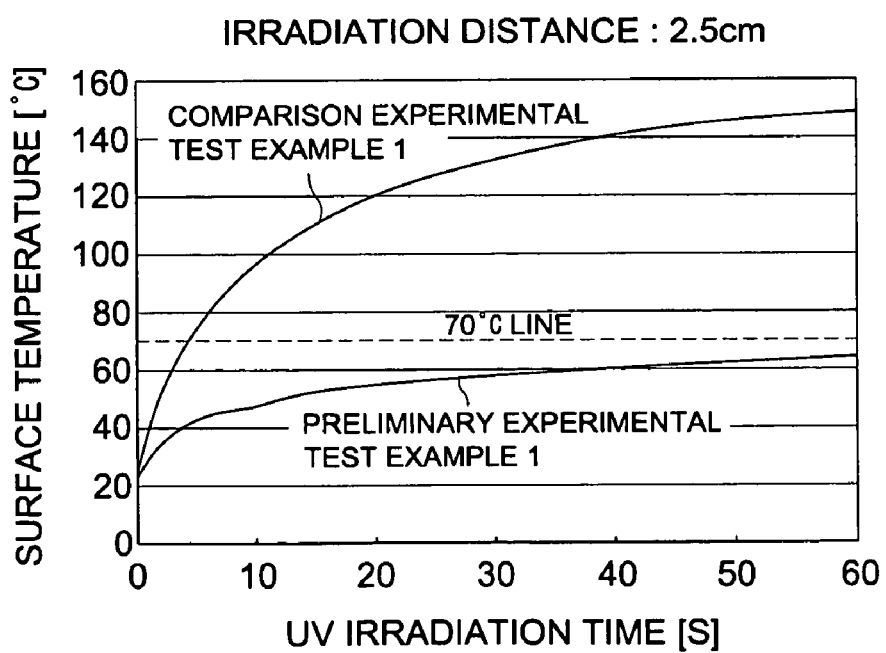
FIG. 8 is a graph showing a relation between UV radiation time and a surface temperature in preliminary experimental test example 1.

As the FIG. 8 shows, in the comparison experiment 1 where UV is radiated directly without using the glass plate (BK7), the temperature rose as the radiation time elapses and at standard maximum radiation time 30 sec., the temperature exceeded 130° C., while in the preliminary experiment example 1 where the glass plate (BK7) is arrange to radiate UV, the temperature do not exceed 60° C. at radiation time of 30 sec., and it was not more than 70° C. a border line where an adverse effect due to temperature rise easily occurs.

Preliminary Experiment Example 2

Figure 9:
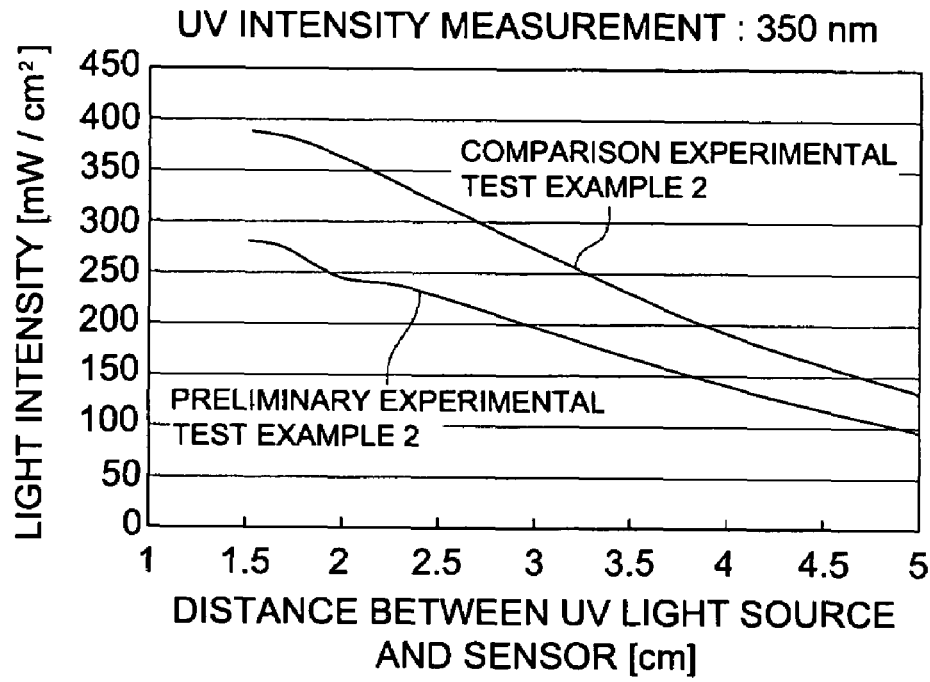
FIG. 9 is a graph showing a relation between a light intensity at a wavelength of 350 nm and a distance from a UV light source to a light intensity sensor surface in preliminary experimental test example 2.

As a preliminary experiment example 2, a surface temperature in the irradiation by UV through a glass plate (BK7) was measured. Also, as a comparative experiment example 1 UV, a surface temperature in the direct irradiation by UV through no glass plate (BK7) was measured. In preliminary experiment example 2 and comparative experiment example 2, a distance from the nozzle end of the same UV light source as preliminary experiment example 1 to the sensor surface where the light intensity is measured was varied in a range from 1.5 to 5 cm for measurement. The results of the measurements are shown in FIG. 9 (wavelength: 350 nm), FIG. 10 (wavelength: 250 nm), FIG. 11 (wavelength 420 nm) and FIG. 12 (wavelength: entire range). Meanwhile, as a light intensity sensor, model No. ORGUV-M10 of ORC Manufacturing Co., Ltd. was used.

Figure 10:
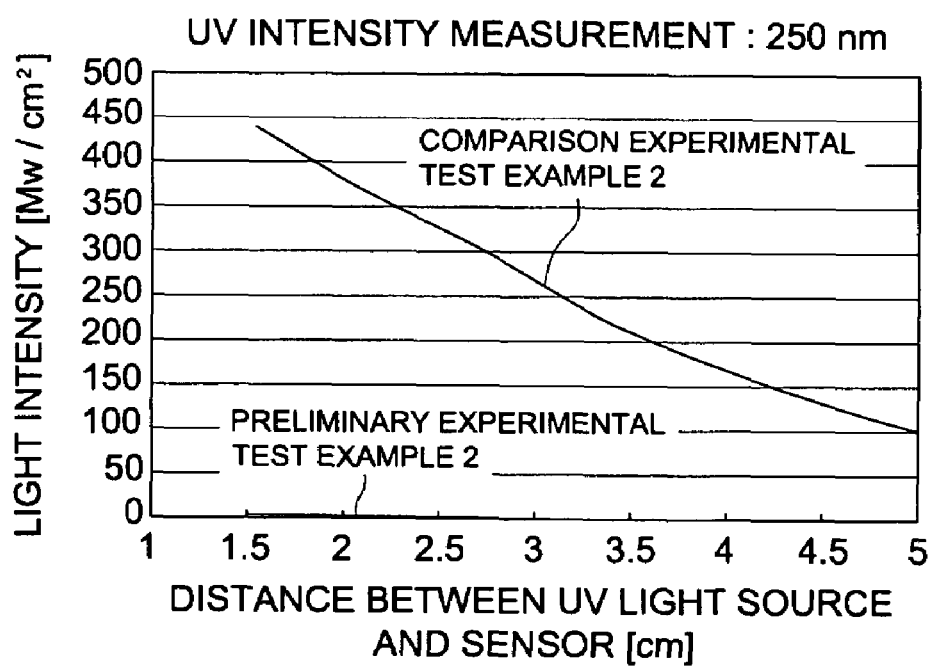
FIG. 10 is a graph showing a relation between a light intensity at a wavelength of 250 nm and a distance from a UV light source to a light intensity sensor surface in preliminary experimental test example 2.
Figure 11:
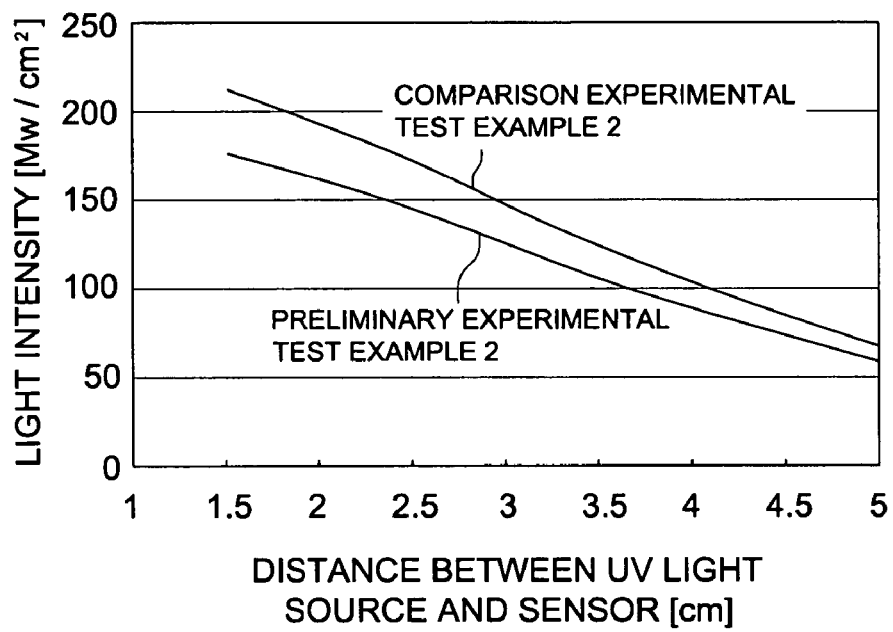
FIG. 11 is a graph showing a relation between a light intensity at a wavelength of 420 nm and a distance from a UV light source to a light intensity sensor surface in preliminary experimental test example 2.
Figure 12:
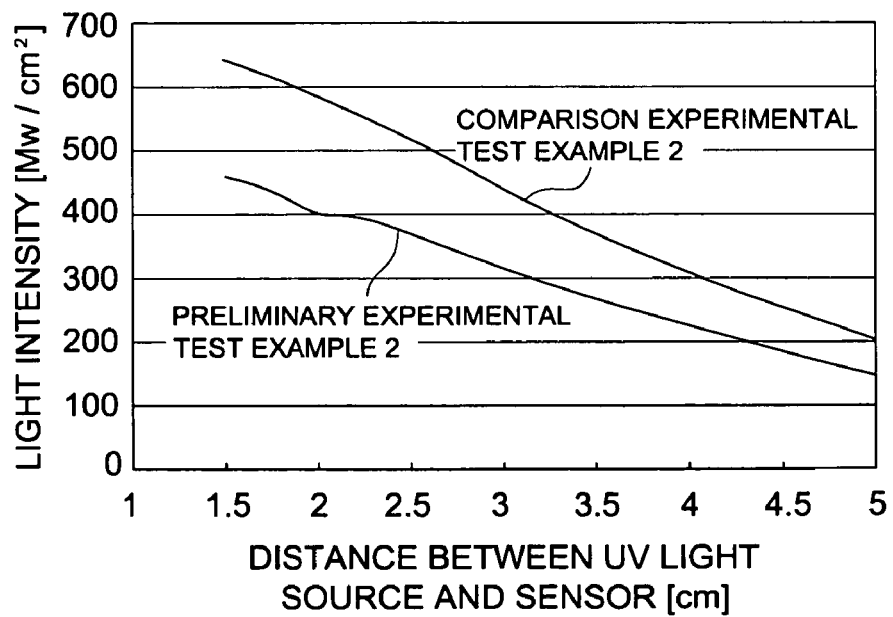
FIG. 12 is a graph showing a relation between a light intensity at a range of all wavelengths and a distance from a UV light source to a light intensity sensor surface in preliminary experimental test example 2.

FIG. 9, FIG. 11 and FIG. 12 clarify that in wavelength of 350 nm, 420 nm and entire range, the light intensity of preliminary experiment example 2 decreased by about 10 to 30% compared with that of comparative experiment example 2, on the other hand, FIG. 10 clarifies that in a wavelength of 250 nm, the decrease of the light intensity was about 98 to 99%. It was clarified that the glass plate arranged in preliminary experiment example 2 can cut off most of the light having the wavelength of 300 nm or less.

Example

Figure 13:
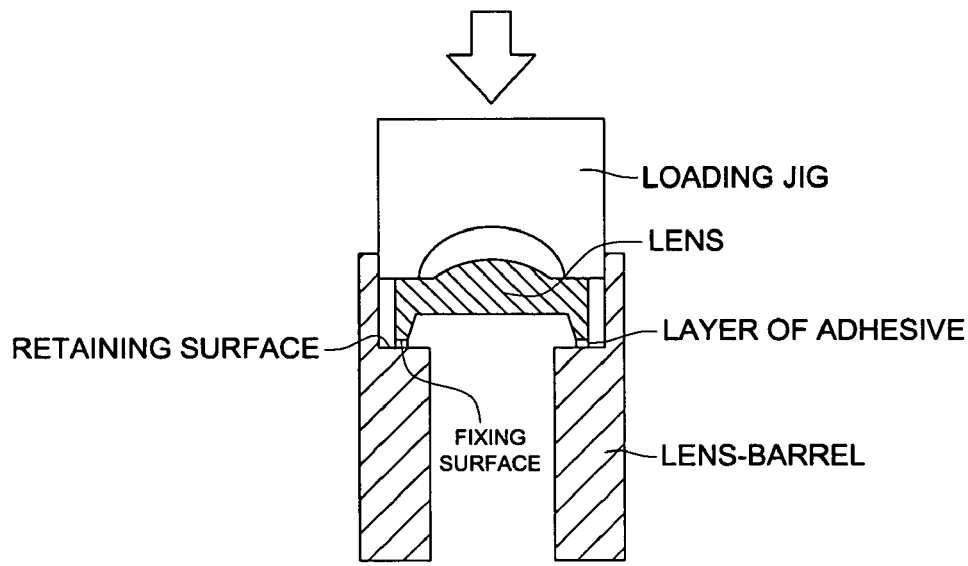
FIG. 13($a$) is a view showing a lens fixing structure in an example.
Figure 13:
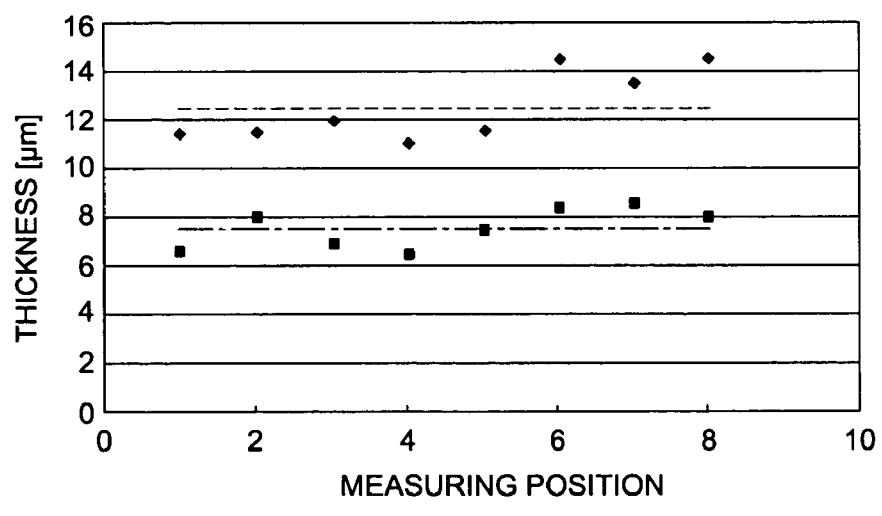
Figure 14:
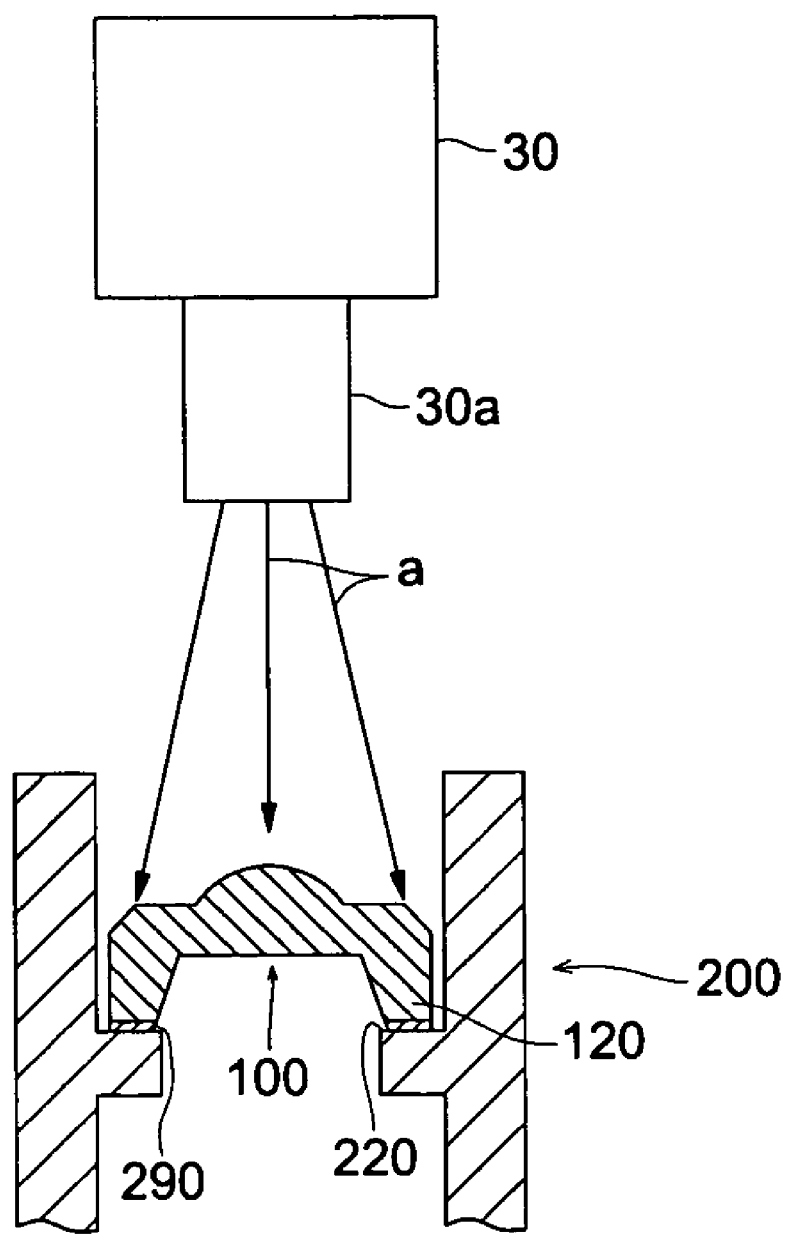
FIG. 14 is a vertical cross-sectional view of essential portion showing a lens fixing structure and a UV light source to explain a conventional fixing method of the optical element.

Next, as an example, a lens barrel having a lens fixing structure such as that in FIG. 13(*a*) similar to FIG. 1 was fabricated. In other words, after applying the adhesive on the retaining surface in the metal lens barrel, the lens mounting surface was brought in contact with the retaining surface, the same UV light source as in the preliminary experiment examples 1 and 2 radiated the UV from above through glass loading jig, and the adhesive on the retaining surface of the lens barrel was irradiated for approx. 30 sec. while cylindrical shaped loading jig (45 g) made of glass (BK7) was placed on the tope of the lens in the same manner as the aforesaid preliminary experiment example 1 and 2. At this time, a pressure of about 1 kgf/cm$^2$ was applied on the adhesive on the retaining surface of the lens barrel by an own weight (45 g). of the loading jig. The lens was a plastic lens with an outside diameter of 4 mm made of resin material of cycloolefin base, an UV-curing epoxy based adhesive was used as the adhesive (trade name: 2500 clear of Electro-Lite Corporation). A viscosity of the adhesive is 500 cP (=0.5 Pa·s).

Also, as a comparative example, the same lens barrel was fabricated in the same process as the aforesaid experimental example, however the adhesive was hardened without using the loading jig in the example of embodiment, and without applying the load on the lens.

The lens barrels respectively of the aforesaid example and comparative example were cut in a cross-section which goes through center of the lens after the adhesive was hardened, and a thickness of the adhesive on the cross-section was measured. The measuring points were 8 random positions and the results of thickness measurements are shown in FIG. 13(*b*).

As FIG. 13(*b*) indicates, the thickness of adhesive after hardening in the example with using the loading jig (45 g) was thinner, compared with that of the comparative example where no load was applied without using loading jig, and the fluctuation of the thickness is small. The fluctuation of the thickness is compared in standard deviation σ, in the comparative example, σ=1.35 while in example σ=0.71, thus a uniformity of thickness of example is better than that of the comparative example.

As stated above, while the preferred embodiment of the present invention have been described, it is to be understood that the present invention is not limited to the embodiment thereof, and changes and variations may be made without departing from the spirit of the invention. For example, in the present embodiment of the invention, loading jigs 31 and 45 are made of glass material (BK7), however the present invention is not limited to this material thereof. Pyrex glass, green glass and white glass can be used. Also as far as the light having the wavelength of not more than 300 nm is absorbed and the light having wavelength of 300 to 450 nm is transmitted, material other then glass can also be used.

Also, the optical elements to be fixed can naturally be these other then lens. For example, a wavelength plate, a diffraction grating and a mirror can be fixed.

What is claimed is:

1. A method of fixing an optical element on a fixing member using an optical-curing adhesive comprising:
   a step of applying the optical-curing adhesive on at least one of adhesion section of the optical element and adhesion section of the fixing member,
   a step of applying a load through a loading jig made of a light-transmissive material,
   a step of radiating light from a light source to the optical-curing adhesive through the loading jig while the load is applied to the adhesion section with the loading jig.

2. A method of fixing the optical element of claim 1, wherein the light-transmissive material absorbs light having a wavelength which does not contribute to curing of the optical-curing adhesive.

3. A method of fixing the optical element of claim 1, wherein the light-transmissive material transmits light having a wavelength which contributes to curing of the optical-curing adhesive.

4. A method of fixing the optical element of claim 1, wherein the light-transmissive material absorbs light having a wave length of not less than 300 nm and transmits light having a wavelength in a rang of 300 to 450 nm.

5. A method of fixing the optical element of claim 1, wherein the loading jig has a restriction section to restrict light so that an optical functional section is not irradiated by the light during radiation of the light.

6. A method of fixing the optical element of claim 1, wherein the loading jig provides an optical waveguide section to guide light to the adhesion section during radiation of the light.

7. A method of fixing the optical element of claim 1, wherein light is radiated after the positioning member positions the fixing member, the optical element, the loading jig and the light source.

8. A method of manufacturing an optical module having an optical element fixed on fixing member by an optical-curing adhesive comprising:
   a step of applying the optical-curing adhesive on at one of adhesion section of the optical element and adhesion section of the fixing member,
   a step of applying a load through a loading jig made of a light-transmissive material,
   a step of radiating light from a light source to the optical-curing adhesive through the loading jig while the load is applied to the adhesive section with the loading jig.

9. A method of the optical element of claim 1, wherein the optical-curing adhesive is a UV-curing adhesive.

10. A method of manufacturing an optical module of claim 8, wherein then the optical-curing adhesive is a UV-curing adhesive.

* * * * *